Sept. 3, 1957   F. A. BURNS ET AL   2,805,004
LIQUID DISPENSER
Filed Jan. 18, 1956   2 Sheets-Sheet 1
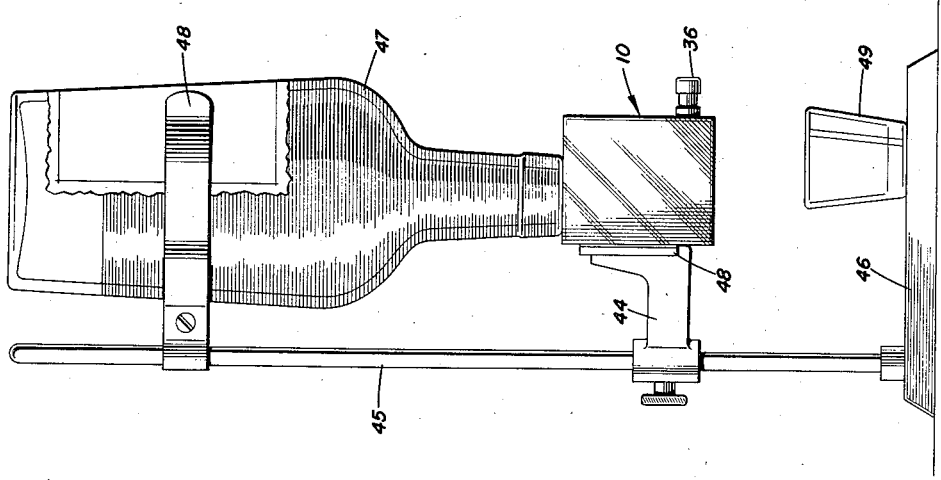
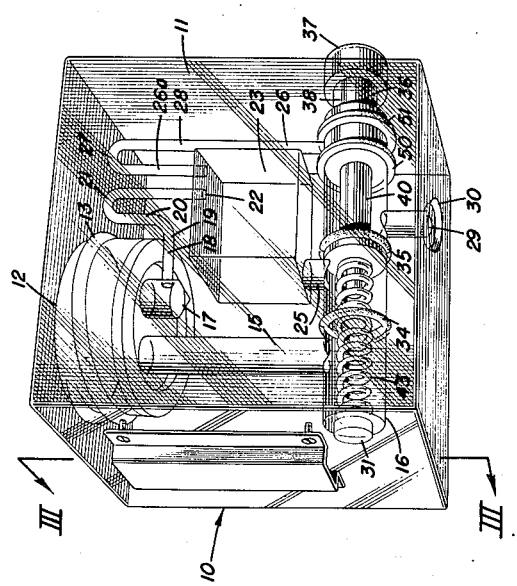
INVENTORS
**FRANCIS A BURNS
ROBERT R. ST. JEAN**
BY *Norman S. Blodgett*
ATTORNEY Sept. 3, 1957     F. A. BURNS ET AL     2,805,004
LIQUID DISPENSER
Filed Jan. 18, 1956     2 Sheets-Sheet 2
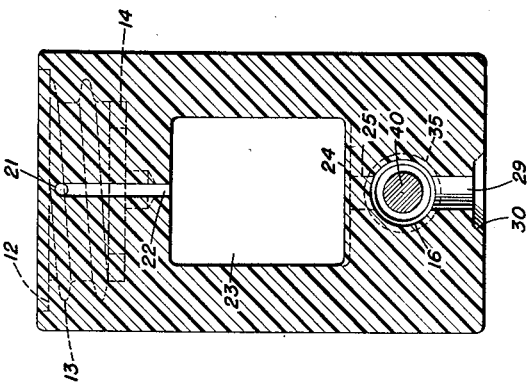
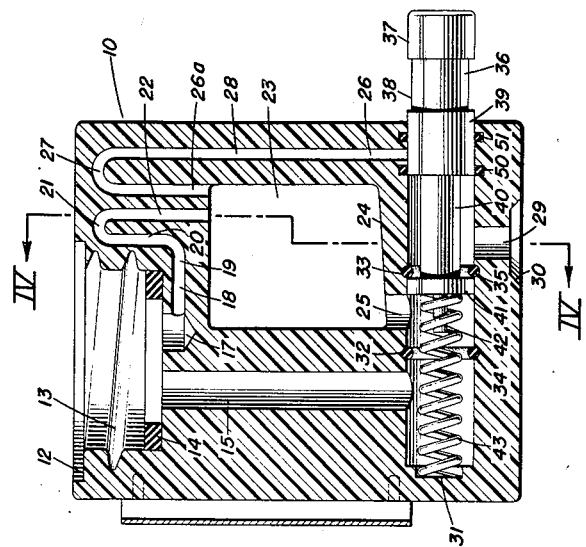
INVENTORS
FRANCIS A. BURNS
ROBERT R. ST. JEAN
BY *Norman S. Blodgett*
ATTORNEY

United States Patent Office 2,805,004
Patented Sept. 3, 1957

2,805,004

LIQUID DISPENSER

Francis A. Burns and Robert R. St. Jean, Auburn, Mass.

Application January 18, 1956, Serial No. 559,823

10 Claims. (Cl. 222—442)

This invention relates to a liquid dispenser and more particularly to apparatus for measuring and pouring a predetermined quantity of liquid from a bottle.

In the past many devices have been evolved for accurately and quickly serving a given amount such as an ounce or "shot" of liquor from a bottle. The original and time-honored method was, of course, that of pouring the liquor into an accurately made container known as a "shot" glass and then transferring the liquor from there into a drinking container, such as a highball glass. When this method is used in a commercial establishment, the bar-tender may be too generous, in which case the management suffers loss, or he may not give the customer the standard amount for which he has paid. The ideal dispenser assures both the customer and the management that the amount of liquor in the drink is accurately measured. Accurate measurement is also important in that the correct proportions of ingredients is, in the case of many types of drinks, critical. At the same time, serving liquor by means of a "shot" glass involved a considerable amount of spilling and is not completely sanitary. Attempts to provide a dispenser of the desired type in the past have all failed for one reason or another; in many cases, they have leaked, thus wasting expensive liquor. They have been expensive to manufacture, complicated, and difficult to maintain. They have easily gotten out of order. The limitations of these previously-known devices are obviated in a novel manner by the present invention.

It is therefore an outstanding object of the invention to provide a dispenser which will accurately and quickly serve a pre-determined amount of liquid from a bottle.

Another object of the instant invention is the provision of a liquor dispenser which is inexpensive to manufacture, simple in construction, and will give a long life of useful service with a minimum of maintenance.

It is a further object of this invention to provide a liquid dispenser which will not waste valuable liquid by leakage and which can be easily cleaned and sterilized.

It is another object of the present invention to provide a dispenser particularly adapted to be formed of non-corrosive transparent plastic materials.

With these and other objects in view, as will be apparent to those skilled in the art, the invention resides in the combination of parts set forth in the specification and covered by the claims appended hereto.

The character of the invention, however, may be best understood by reference to certain of its structural forms, as illustrated by the accompanying drawings in which:

Figure 1 is a perspective view of a preferred embodiment of the invention,

Figure 2 is a more or less schematic view of the invention in use,

Figure 3 is a sectional view of the invention taken on the line III—III of Figure 1, and Figure 4 is a sectional view taken on the line IV—IV of Figure 3.

Referring first to Figure 1, wherein is best shown the general features of the invention, the dispenser, indicated generally by the reference numeral 10, is shown as comprising a body 11 formed from a solid block of transparent plastic and in the shape of a rectangular parallelepiped. Extending downwardly from the top surface is a large threaded bore 12 having a coarse thread 13 adapted to fit the thread on the neck of a container, such as a liquor bottle. Seated in the bottom of the bore 12 is a sealing washer 14 formed of a resilient material such as rubber. Passing downwardly from the bottom of the bore 12 at one side thereof is a passage 15 of circular cross-section. A valve bore 16 enters the body 11 from one side and ends in a dead end adjacent the opposite side thereof. The passage 15 enters the bore 16 adjacent the dead end. A short bore 17 extends downwardly from the bottom of the bore 12 and from the bore 17 extends a first air passage 18. The passage 18 is of relatively small bore and is provided with a horizontal portion 19 leaving the bore 17 which passes into a vertical portion 20 connected by a semi-circular portion 21 to a vertical portion 22. The lower end of the vertical portion of the passage 18 enters the upper side of a metering chamber 23 which is generally rectangular parallelepiped form with the exceptions that the covers are rounded and a bottom side 24 is inclined downwardly in the direction of the passage 15. The top of the chamber 23 is on a level somewhat below the bottom of the bore 17 and the horizontal portion 19 of the air passage 18. A vertical passage 25 of circular cross-section leaves the lowermost part of the chamber 23 and enters the bore 16 at a position somewhat removed from the entrance of the passage 15 thereto. A second air passage 26 opens into the top of the chamber 23 adjacent the entrance of the passage 18 thereto; the passage 26 is of the same small bore as the passage 18. The passage 26 consists of a vertical portion 26a extending upwardly from the top of the metering chamber connected at its upper end by a semi-circular portion 27 to a vertical portion 28 which connects at its lower end to the bore 16 at a point thereof adjacent its entrance. The semi-circular portions 21 and 27 of the air passages 18 and 25, respectively, are of approximately the same radius and lie on the same level within the body. A dispensing passage 29 extends downwardly from the bore 16 at a position between the passages 25 and 26 and is provided at its lower opening on the bottom of the body with a beveled counterbore 30. The dead end 17 of the plunger bore 16 is provided with a short extension 31 of considerably smaller diameter than the main bore. A groove 32 of semi-circular cross-section is formed in the bore 16 at a position between the passages 15 and 25, while a similar groove 33 is situated between the passages 25 and 29. O-rings 34 and 35, formed of a resilient, non-corrosive material such as rubber, are positioned in the grooves 32 and 33, respectively.

Residing in the bore 16 and slidable therein is a plunger 36 having a depressing portion 37 at its outer end; this portion is of the same diameter as the bore and has its outer edge suitably rounded. Next to the depressing portion of the plunger is situated an air-relief portion 38 of considerably smaller diameter than the bore. At the inward end of the air-relief portion is a first valving portion 39 which fits the bore tightly and is slidable therein. This last portion is joined by a spindle 40 of considerably reduced diameter to second valving portion 41 which is of the same diameter as the bore 16. Extending from the inner side of the valving portion 41 is peg 42 of reduced diameter; a coil spring 43 lies in the bore 16 and extends under compression between the peg 42 and the extension 31 of the bore. The distances between the elements of the invention and their relative sizes will be best explained in connection with the operation of the apparatus. An O-ring 50 is situated in a groove on one side of the vertical portion 28 of the passage 26 while a similar O-ring 51 is located on the other side. The O-rings are of such a size as to rub the surface of the plunger slightly and serve to prevent leakage.

The operation of the invention will now be clearly understood in view of the above description. Referring first to Figure 2, it will be understood that the dispenser 10 will be suitably mounted for use. One possible mounting means would be that in which the dispenser is fastened by a quick-release connection 48 to a bracket 44 which is adjustably mounted on a stanchion 45 extending vertically upwardly from a heavy base 46. A container such as a bottle 47 containing a liquid, which may be liquor, is screwed into the threaded bore 12 until the mouth of the bottle presses tightly against the washer 14 which acts as a seal. This operation is preferably done with the mouth of the bottle uppermost and the dispenser 10 removed from the bracket 44. After the union has been made, the assembly is inverted and the dispenser fastened to the bracket, the bottle being in the upside-down position shown in the drawing. A clamping means 48 is preferably used to join the bottle to the upper part of the stanchion 45 to give greater stability to the assembly. A glass 49 is then placed on the base 46 under the dispensing passage 29 and the dispensing cycle is begun.

In its state of rest, the plunger 36 is resiliently biased outwardly of the bore (to the right in Figure 3) with the righthand corner of the second valving portion 41 tightly pressed against the O-ring 35. In this situation, the entrance of the bore 26 into the bore 16 is covered by the first valving portion 39 and an uninterrupted path exists through the bore 16 and the O-ring 32 between the passages 15 and 25. Liquor flows from the bottle down the passage 15 through the bore 16 and up the passage 25 into the metering chamber 23. The coil spring 43 and the O-ring 32 do not present any appreciable resistance to this flow. As the liquid flows into the chamber 23, the air trapped in the upper part of the chamber is driven into the passage 18 wherein it flows up the vertical portion 22, around the semi-circular portion 21, down the vertical portion 20, and along the horizontal portion 19, into the short bore 17. From there the air passes upwardly into the bottle where it replaces the liquid being removed, in the usual manner. When the chamber 23 is full, the action ceases automatically. The operator presses the plunger 36 and causes it to move inwardly (to the left in Figure 3) against spring pressure. The second valving portion moves from its position in contact with the O-ring 35 to a position in contact with the O-ring 34. In this situation, a clear path is provided for the liquid to flow from the chamber 23 down the passage 25 through the bore 16 around the spindle 40, down the passage 29 into the glass. At the same time, the first valving portion is moved away from the entrance of the air passage 26 to the bore 16; this means that, as liquid leaves the metering chamber, air will flow into the top of the chamber from the passage 26 after entering the dispenser through the annular space between the entrance to the bore 16 and the air-relief portion 38 of the plunger, passing upwardly through the vertical portion 28 of the air passage 25, through the semicircular portion 27, and down the vertical portion 26a into the chamber. When the chamber 23 is empty and the plunger 36 is released, the cycle is repeated. Because of the unique construction, the re-filling and the emptying of the chamber take place very rapidly.

It can be seen, then, that the size of the metering chamber 23 is critical to the dispensing of an accurate amount of liquid. Furthermore, the length of movement of the plunger as the second valving portion is moved from O-ring to O-ring is determinative of certain critical distances between elements of the dispenser. For instance, the entrance of the passage 25 to the bore 16 must be situated so that the second valving portion 41 is situated to its right when in chamber-filling position and to its left in chamber-emptying position. Also, the entrance of the passage 26 into the bore 16 must be correlated to the length of the first valving portion so as to be covered in the chamber-filling position and uncovered during chamber-emptying position. The passages 15 and 29 are situated so that they are never covered.

While it will be apparent that the illustrated embodiment of the invention herein disclosed is well calculated to fulfill adequately the objects and advantages primarily stated, it is to be understood that the invention is susceptible to variation, modification and change within the spirit and scope of the subjoined claims.

The invention having been thus described, what is claimed as new and desired to secure by Letters Patent is:

1. A dispenser for use with a container holding liquid comprising a body having a bore to which the container may be connected in sealed relation, a metering chamber having a liquid opening at its lower end, a valve bore, an air passage extending from the said bore to the part of the metering chamber away from the liquid opening, a plunger situated in the valve bore, the plunger being movable from a first chamber-filling position to a second chamber-emptying position, means operative when the plunger is in the first position for causing liquid to flow from the container into the chamber and causing air to flow from the chamber into the container, and means operative when the plunger is in the second position to cause liquid to flow from the chamber to the exterior of the body and to expose the opening of the said air passage into the said bore to be exposed to the atmosphere causing air to flow from the exterior of the body into the chamber.

2. A dispenser for use with a container holding liquid comprising a body having a vertical bore to which the container may be connected in sealed relation, a metering chamber having a liquid opening at its lower end, a horizontal valve bore, an air passage extending from the said bore to the part of the metering chamber away from the liquid opening, a plunger situated in the valve bore, the plunger being movable horizontally in the bore from a first chamber-filling position to a second chamber-emptying position, means operative when the plunger is in the first position for causing liquid to flow from the container into the chamber and causing air to flow from the chamber into the container, and means operative when the plunger is in the second position to cause liquid to flow from the chamber to the exterior of the body and to expose the opening of the said air passage into the said bore to be exposed to the atmosphere causing air to flow from the exterior of the body into the chamber.

3. A dispenser for use with a container holding liquid comprising a body having a bore to which the container may be connected in sealed relation, a metering chamber having a liquid opening at its lower end, a valve bore, an air passage extending from the said bore to the part of the metering chamber away from the liquid opening, a plunger situated in the valve bore, the plunger being movable from a first chamber-filling position to a second chamber-emptying position, means including passages operative when the plunger is in the first position for causing liquid to flow from the container into the chamber and causing air to flow from the chamber into the container, and means including passages operative when the plunger is in the second position to cause liquid to flow from the chamber to the exterior of the body and to expose the opening of the said air passage into the said bore to be exposed to the atmosphere causing air to flow from the exterior of the body into the chamber.

4. A dispenser for use with a container holding liquid comprising a body having a vertical bore to which the container may be connected in sealed relation, a metering chamber having a liquid opening at its lower end, a horizontal valve bore, an air passage extending from the said bore to the part of the metering chamber away from the liquid opening, a plunger situated in the valve bore, the plunger being movable horizontally in the bore from a first chamber-filling position to a second chamber-emptying position, means including passages operative when the plunger is in the first position for causing liquid to flow from the container into the chamber and causing air to flow from the chamber into the container, and means including passages operative when the plunger is in the second position to cause liquid to flow from the chamber to the exterior of the body and to expose the opening of the said air passage into the said bore to be exposed to the atmosphere causing air to flow from the exterior of the body into the chamber.

5. A dispenser for use with a container holding liquid comprising a body having a bore to which the container may be connected in sealed relation, a metering chamber having a liquid opening at its lower end formed in the body, an air passage extending from the said bore to the part of the metering chamber away from the liquid opening, a valve bore extending into the body, a plunger situated in the valve bore, the plunger being movable from a first chamber-filling position to a second chamber-emptying position, means operative when the plunger is in the first position including a passage for causing liquid to flow from the container into the chamber and including a passage of small bore causing air to flow from the chamber into the container, and means operative when the plunger is in the second position including a passage to cause liquid to flow from the chamber to the exterior of the body and to expose the opening of the said air passage into the said bore to be exposed to the atmosphere causing air to flow from the exterior of the body into the chamber.

6. A dispenser for use with a bottle holding a liquid comprising a body, a threaded bore formed in the body in which the bottle may be connected in sealed relation, a metering chamber formed within the body, a valve bore formed in the body and underlying the chamber, a first passage joining the threaded bore to the valve bore, a second passage joining the bottom of the chamber to the valve bore, a third passage of small bore joining the upper part of the chamber to the threaded bore, a fourth passage of small bore joining the upper part of the chamber to the valve bore, a plunger residing in the valve bore and movable between a first and a second position, the plunger being so formed that in the first position liquid can flow from the first passage to the second passage and air can flow through the third passage from the chamber to the bottle, the plunger being so formed that in the second position liquid may flow from the chamber through the second passage and the valve bore to the exterior of the body, the plunger having a reduced portion so located that in the said second position air can flow to the chamber from the exterior of the body through the fourth passage.

7. A dispenser for use with a bottle holding a liquid comprising a body of rectangular parallelepiped form, a threaded bore entering the top of the body in which the bottle may be connected in inverted condition, a metering chamber formed centrally of the body, a valve bore entering one side of the body and underlying the chamber, a first passage joining the threaded bore to the valve bore, a second passage joining the bottom of the chamber to the valve bore, a third passage of small bore joining the upper part of the chamber to the threaded bore, a fourth passage of small bore joining the upper part of the chamber to the valve bore, a plunger residing in the valve bore and movable between a first and a second position, the plunger being so formed that in the first position liquid can flow from the first passage to the second passage and air can flow through the third passage from the chamber to the bottle, the plunger being so formed that in the second position liquid may flow from the chamber through the second passage and the valve bore to the exterior of the body, the plunger having a reduced portion situated so that in the second position air can flow to the chamber from the exterior of the body through the fourth passage.

8. A dispenser for use with a bottle holding a liquid comprising a body formed of transparent plastic material, a threaded bore formed in the body, a resilient washer seated in the bottom of the bore so that the bottle may be connected to the body in sealed relation, a metering chamber formed within the body, a valve bore formed in the body and underlying the chamber, a first passage joining the threaded bore to the valve bore, a second passage joining the bottom of the chamber to the valve bore, a third passage of small bore joining the upper part of the chamber to the threaded bore, a fourth passage of small bore joining the upper part of the chamber to the valve bore, a plunger residing in the valve bore and movable between a first and a second position, the plunger being so formed that in the first position liquid can flow from the first passage to the second passage and air can flow through the third passage from the chamber to the bottle, the plunger being so formed that in the second position liquid may flow from the chamber through the second passage and the valve bore to the exterior of the body, the plunger having a reduced portion situated so that in the second position air can flow to the chamber from the exterior of the body through the fourth passage.

9. A dispenser for use with a bottle holding a liquid comprising a body formed of transparent plastic material, a threaded bore formed in the body in which the bottle may be connected in sealed relation, a metering chamber formed within the body, a valve bore formed in the body and underlying the chamber, a first passage joining the threaded bore to the valve bore, a second passage joining the bottom of the chamber to the valve bore, a third passage of small bore joining the upper part of the chamber to the threaded bore and having a loop above the chamber, a fourth passage of small bore joining the upper part of the chamber to the valve bore and having a loop above the chamber, a plunger residing in the valve bore and movable between a first and a second position, the plunger being provided with first and second valving portions which fit closely within the bore such that in the first position liquid can flow from the first passage to the second passage and air can flow through the third passage from the chamber to the bottle, the first valving portion closing off the fourth passage and the second valving portion preventing flow of liquid from any passage to the exterior of the body and such that in the second position liquid may flow from the chamber through the second passage and the valve bore to the exterior of the body and the first valving portion being removed from the fourth passage so that air can flow to the chamber from the exterior of the body through the fourth passage, the second valving portion preventing flow from the first passage to any other passage.

10. A dispenser for use with a bottle holding a liquid comprising a body formed of transparent plastic material, a threaded bore formed in the body in which the bottle may be connected in sealed relation, a metering chamber formed within the body, a valve bore formed in the body and underlying the chamber, a first passage joining the threaded bore to the valve bore, a second passage joining the bottom of the chamber to the valve bore, a third passage of small bore joining the upper part of the chamber to the threaded bore and having a loop above the chamber, a fourth passage of small bore joining the upper part of the chamber to the valve bore and having a loop above the chamber, a fifth passage leading from the bore to the exterior of the body, a plunger residing in the valve bore and movable between a first and a second position, the plunger having a valving portion which in the first position lies in the valve bore between the second passage and the fifth passage and which in the second position lies between the first passage and the second passage, so that in the first position liquid can flow from the first passage to the second passage and air can flow through the third passage from the chamber to the bottle, and so that in the second position liquid may flow from the chamber through the second passage, the valve bore, and the fifth passage to the exterior of the body and air can flow to the chamber from the exterior of the body through the fourth passage.

References Cited in the file of this patent

UNITED STATES PATENTS

| | | |
|---|---|---|
| 1,030,322 | Noonan | June 25, 1912 |
| 1,719,348 | Weightman | July 2, 1929 |
| 1,938,892 | Buttner | Dec. 12, 1933 |